US007214330B2

(12) United States Patent
Nagashima et al.

(10) Patent No.: US 7,214,330 B2
(45) Date of Patent: May 8, 2007

(54) METHOD OF MANUFACTURING PHOSPHOR POWDER, PHOSPHOR POWDER, AND PHOSPHOR COMPOSITION

(75) Inventors: Kazuro Nagashima, Ohnojo (JP); Masayuki Maekawa, Sasaguri-machi (JP); Seiyu Teruya, Chikushino (JP); Fujio Amada, Chikushino (JP); Junichi Ozawa, Honami-machi (JP)

(73) Assignee: Shoei Chemical Inc., Tokyo (JP)

( * ) Notice: Subject to any disclaimer, the term of this patent is extended or adjusted under 35 U.S.C. 154(b) by 191 days.

(21) Appl. No.: 10/903,281

(22) Filed: Jul. 30, 2004

(65) Prior Publication Data

US 2005/0035332 A1    Feb. 17, 2005

(30) Foreign Application Priority Data

Aug. 14, 2003    (JP)    ............................. 2003-293334

(51) Int. Cl.
*B22F 9/30* (2006.01)
*C09K 11/08* (2006.01)

(52) U.S. Cl. .................... 252/301.4 R; 252/301.4 P; 252/301.4 F; 252/301.4 S; 252/301.4 H; 252/301.5; 252/301.6 P; 252/301.6 F; 252/301.6 S; 252/301.6 R

(58) Field of Classification Search .................... None
See application file for complete search history.

(56) References Cited

U.S. PATENT DOCUMENTS 3,668,455 A * 6/1972 Dale et al. ................. 313/486

6,627,113 B2 * 9/2003 Kijima et al. ......... 252/301.4 R
2003/0209693 A1 * 11/2003 Kijima et al. ......... 252/301.4 R

FOREIGN PATENT DOCUMENTS

| JP | 11-144625 | 5/1999 |
|----|-----------|--------|
| JP | 2000-336353 | 12/2000 |
| JP | 2001-303045 | 10/2001 |

* cited by examiner

*Primary Examiner*—C. Melissa Koslow
(74) *Attorney, Agent, or Firm*—Flynn, Thiel, Boutell & Tanis, P.C.

(57) ABSTRACT

A method of manufacturing a highly crystallized phosphor powder, comprising: making a raw material solution containing metal elements and/or semimetal elements that will be constituents of the phosphor into fine liquid droplets, subjecting the liquid droplets to decomposition by heating at a temperature of 500 to 1800° C. to produce hollow precursor particles and/or porous precursor particles, heating the precursor particles to crystallize the precursor particles while maintaining the hollow or porous form, and grinding the crystallized particles down to a predetermined particle size. The obtained phosphor powder is a high luminance inorganic phosphor powder that is extremely fine, and yet has few defects on the surface of or inside the powder, and hence has excellent crystallinity and light emission characteristics, and provides a phosphor composition useful for producing a phosphor layer with high coverage and high luminance of light emission.

4 Claims, 5 Drawing Sheets

METHOD OF MANUFACTURING PHOSPHOR POWDER, PHOSPHOR POWDER, AND PHOSPHOR COMPOSITION

BACKGROUND OF THE INVENTION

1. Field of the Invention

The present invention relates to a high luminance inorganic phosphor powder having excellent light emission characteristics that is suitable for forming a phosphor layer in a plasma display panel (PDP), a fluorescent lamp, a fluorescent display tube, a solid state light emitting diode (LED), or the like, a method of manufacturing the phosphor powder, and a phosphor composition containing the phosphor powder.

2. Description of the Prior Art

To form a film-like phosphor layer in a display device such as a PDP, a fluorescent lamp, a fluorescent display tube, or the like, a phosphor green sheet or a phosphor ink or phosphor paste comprising a phosphor powder of an oxide type, a sulfide type or the like dispersed in a resin and/or a solvent is stuck or applied onto a glass substrate, and then baking is carried out. Moreover, with a solid state light emitting diode such as a white LED, a phosphor layer is formed on the light emitting surface of the device by curing a resin composition comprising such a phosphor powder dispersed therein.

As the above-mentioned phosphor powder, a powder comprising relatively large irregularly shaped or spherical particles of particle size approximately 3 to 10 μm is generally used.

However, in the case of using such a phosphor powder in a fluorescent lamp or any of various display devices using short wavelength ultraviolet radiation or a low-speed electron beam as an excitation source, the penetration of the ultraviolet radiation or electron beam into the particles is low, and hence excitation cannot be carried out as far as the inside of the phosphor particles. The region contributing to light emission is thus limited to a surface layer of the phosphor particles, and hence the efficiency is poor, leading to high cost.

Moreover, in the case of using a phosphor powder having a large particle size, to increase the coverage of the phosphor layer, the thickness of the phosphor layer must be made high. As a result, the amount of the phosphor applied increases, and hence the cost increases. Furthermore, due to the thickness of the phosphor layer being high, absorption and scattering of the excitation ultraviolet radiation and absorption and scattering of the visible light emitted through the fluorescence increase, and hence with a transmission type light emitting apparatus such as a fluorescent lamp, the light emission efficiency of the apparatus drops.

To resolve these problems, it is thought to be desirable to make the phosphor powder as fine as possible so as to reduce the thickness of the phosphor layer without reducing the coverage of the phosphor layer. However, with conventionally obtained fine phosphor powders, upon making the phosphor powder finer the luminance of light emission drops, and hence the actual state of affairs is that a fine phosphor powder having a sufficient luminance of light emission for practical use has not been obtained.

Specifically, most phosphor powders currently put to practical use are manufactured through the flux method which is a solid-phase reaction method. In this method, raw material powders are mixed together and heated at a high temperature with a flux in a baking vessel such as a crucible to bring about a solid-phase reaction, and then the reaction product is ground in a ball mill or the like, whereby the phosphor powder is manufactured. With this method, to increase the compositional homogeneity, heat treatment must be carried out for a long time at a high temperature, but through the heat treatment the product undergoes much grain growth and thus becomes lumpy, and hence to obtain a fine phosphor powder, grinding must be carried out for a long time with a very large force. In this case, due to being subjected to physical shock and chemical reaction during the grinding, the particle surface undergoes alteration, and moreover many defects are produced on the surface of and inside the powder, and hence the luminance of light emission drops drastically. It has thus been almost impossible in practice to obtain a phosphor having a particle size of not greater than 2 μm and a luminance sufficient for practical use.

On the other hand, a method of manufacturing an inorganic phosphor having a mean primary particle size of not more than 200 nm and a higher-order aggregate particle size of not more than 1.0 μm using a sol-gel method which is a wet method has also been disclosed (see Japanese Patent Publication No. 2001-303045A). However, with the sol-gel method, the cost is high for reasons such as high-purity raw materials being required. Moreover, through heat treatment at a high temperature which is carried out to remove hydroxyl groups from and crystallize the powder produced, the particles produced are prone to being sintered more than necessary and thus becoming coarse. To make the particles fine, as with the solid-phase reaction method, it is thus necessary to carry out grinding with a very large force, and hence many defects are produced on the surface of and inside the powder, and thus the luminance of light emission drops.

The manufacture of solid spherical fine particles using a spray pyrolysis method is also known (see Japanese Patent Publication No. 2000-336353A), but the ability to carry out mass production is poor, and moreover it has again been difficult to obtain a high luminance phosphor powder having a mean particle size of not greater than 2.0 μm. It is thought that this is because with the spray pyrolysis method, the residence time of the particles in the heating apparatus is short at approximately 0.1 to a few tens of seconds, and hence the crystal lattice of the phosphor particles produced contains many defects and much strain caused by rapid cooling after the heating. If the phosphor particles obtained through the pyrolysis method are subjected to annealing treatment at a high temperature to increase the luminance, then the particles agglomerate. However, in the case of treating at a temperature at which agglomeration does not occur, a sufficient luminance is not obtained. To reduce the effects of the rapid cooling, trials have been carried out in which the residence time during the spray pyrolysis is made to be several minutes or more, but a drop in the manufacturing efficiency is unavoidable, and hence this method is not practical industrially.

Moreover, to obtain the same effects as in the case of making the phosphor particles fine, the use of flake-like phosphor particles has been proposed (see Japanese Patent Publication No. 11-144625A). Such flake-like phosphor particles are manufactured using a solid-phase reaction method, with a plate-shaped phosphor powder being obtained by shortening the time of the solid-phase reaction. However, with the phosphor particles obtained through this method, only the surface portion has high crystallinity, and hence if the wavelength of the excitation light is longer than that of the 147 nm vacuum ultraviolet radiation used in the PDP, then sufficient luminance of light emission is not obtained.

SUMMARY OF THE INVENTION

It is an object of the present invention to solve such problems of the prior art, and provide a fine inorganic phosphor powder having a mean particle size of not greater than 2 μm according to which high coverage and high luminance of light emission can be obtained even in the case that the amount applied of the phosphor is low and the thickness of the phosphor layer is low. In particular, it is an object to provide a method of manufacturing a high luminance inorganic phosphor powder that is extremely fine, and yet has few defects on the surface of or inside the powder, and hence has excellent crystallinity and light emission characteristics.

It is another object of the present invention to provide a novel manufacturing method that enables a high luminance inorganic phosphor powder having a desired particle shape and excellent crystallinity to be manufactured easily and efficiently.

Furthermore, it is another object of the present invention to provide a phosphor composition that is useful for producing a phosphor layer with high coverage and high luminance of light emission, the phosphor composition being, for example, a paste, ink or green sheet using a phosphor powder as above, or a resin composition having a phosphor powder as above dispersed therein.

To solve the above problems, the present inventors carried out assiduous studies into a method of manufacturing phosphor particles that is based on the spray pyrolysis method and makes use of the merits of this method, and as a result discovered a novel method of manufacturing high luminance phosphor particles.

That is, the present invention is as follows.

(1) A method of manufacturing a highly crystallized phosphor powder, comprising: making a raw material solution containing metal elements and/or semimetal elements that will be constituents of the phosphor into fine liquid droplets, subjecting the liquid droplets to decomposition by heating at a temperature of 500 to 1800° C. to produce hollow precursor particles and/or porous precursor particles, heating the precursor particles to crystallize the precursor particles while maintaining the hollow or porous form, and grinding the crystallized particles down to a predetermined particle size.

(2) The method according to (1) above, wherein the precursor particles are amorphous according to X-ray diffraction patterns.

(3) The method according to (1) or (2) above, wherein the powder obtained through the grinding is further subjected to annealing treatment.

(4) The method according to any of (1) through (3) above, wherein the crystallized particles are polycrystals comprising crystallites having a crystallite size of at least 50 nm.

(5) A highly crystallized phosphor powder manufactured using the method according to any of (1) through (4) above.

(6) The highly crystallized phosphor powder according to (5) above, having a mean particle size of 0.1 to 2 μm.

(7) A phosphor composition comprising the highly crystallized phosphor powder according to (5) or (6) above, and a resin and/or a solvent.

According to the present invention, a phosphor powder comprising compositionally-homogeneous and highly-crystallized fine phosphor particles can be obtained easily. That is, because a spray pyrolysis method is essentially used, the composition of the particles produced basically matches the metal composition in the solution, and hence controlling the composition is easy, and moreover there are few impurities, the compositional homogeneity is high, and in particular the dispersion state of activators is very good.

Moreover, the phosphor powder obtained using the method of the present invention has very good light emission characteristics. Whereas with a phosphor powder obtained using a conventional solid-phase reaction method or the like, the luminance drops dramatically as the particle size is reduced, with the phosphor powder obtained in the present invention, there is very little drop in the luminance of light emission upon making the powder fine, and in particular a very high luminance is obtained even with a fine powder having a mean particle size of 0.1 to 2 μm. Even if the luminance does drop upon making the powder fine, the luminance can surprisingly be restored easily by subjecting the phosphor powder to annealing treatment at a high temperature as required.

Consequently, a very luminescent fine powder having a mean particle size of not greater than 2 μm for which manufacture has been difficult using conventional methods can be obtained easily by grinding for a short time, and as a result it becomes possible to obtain a phosphor layer with high coverage and high luminance even in the case that the amount applied of the phosphor is low and the thickness of the phosphor layer is low.

Another excellent point of the manufacturing method of the present invention is that phosphor particles having any of various shapes and structures can be produced by selecting and setting the precursor powder production conditions and the grinding conditions as appropriate. For example, a powder comprising substantially only flat particles, or a powder comprising particles that are not flat, for example spherical, granular or irregularly shaped, or a mixed powder thereof, can be manufactured in any chosen ratio through the same process. Moreover, depending on the grinding conditions, any particles from polycrystalline particles to monocrystalline particles can be produced.

DETAILED DESCRIPTION OF THE PREFERRED EMBODIMENTS

Figure 1:
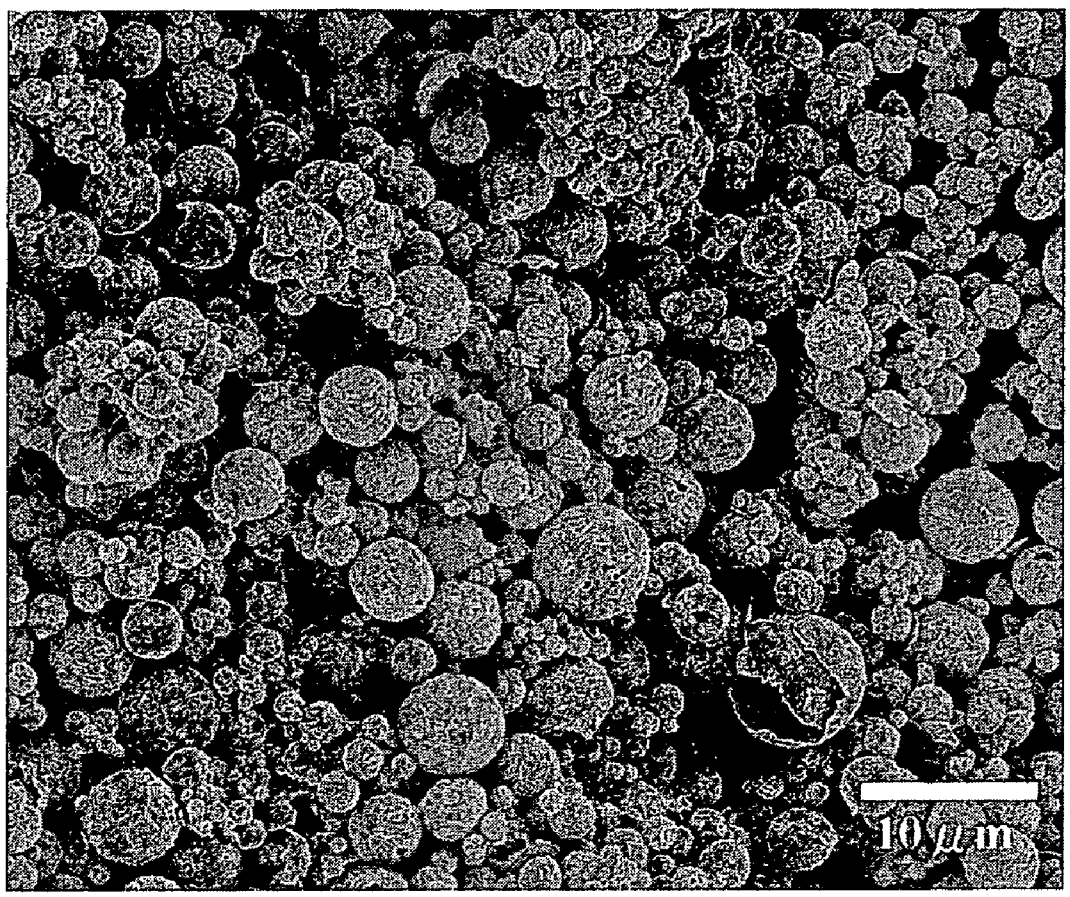
FIG. 1 is an SEM micrograph of a precursor powder of Example 1 after crystallization.

There are no particular limitations on the phosphor powder manufactured in the present invention provided the phosphor is an inorganic phosphor; the phosphor may be an oxide type phosphor having an oxide as a mother crystal, or else a sulfide type, an oxysulfide type, a nitride type, an oxynitride type, or the like. Examples include visible light emitting phosphors and ultraviolet light emitting phosphors such as $SrAl_2O_4$:Eu, $(Sr,Ca)B_4O_7$:Eu, $Y_2SiO_5$:Ce, $BaMgAl_{10}O_{17}$:Eu, $BaAl_{12}O_{19}$:Mn, $Y_3Al_5O_{12}$:Ce, $Y_3Al_5O_{12}$:Tb, $Zn_2SiO_4$:Mn, $InBO_3$:Tb, $Y_2O_3$:Eu, $InBO_3$:Eu, $YVO_4$:Eu, $Mg_2SiO_4$:Mn, $Zn_3(PO_4)_2$:Mn, $YBO_3$:Eu, $(Y,Gd)BO_3$:Eu, $(Y,Gd)BO_3$:Tb, $SrTiO_3$:Eu, $ZnO$—$LiGaO_2$, $Ca_3Y_2Si_6O_8$:Ce, $(Si,Al)_6(O,N)_8$:Eu, $Ca_x(Si,Al)_{12}(O,N)_{16}$:Eu, ZnS:Cu, CaS:Ce, $Y_2O_2S$:Eu, and $Ca_{10}(PO_4)_6Cl_2$.

The phosphor powder of the present invention is characterized in that it is obtained by crushing crystalline hollow particles or crystalline porous particles through grinding. Note that here the crystalline hollow particles or porous particles may be fragment-like particles produced through breakage of hollow particles or porous particles, and in the present invention 'hollow particles' and 'porous particles' include such fragment-like particles.

Next, a method of manufacturing the phosphor powder of the present invention will be described in detail.

First, raw material compounds containing the constituent elements of the targeted phosphor are dissolved or dispersed in water, an organic solvent such as an alcohol, acetone or an ether, or a solvent comprising a mixture thereof, thus preparing a raw material solution. As the raw material compounds, for example pyrolyzable compounds such as nitrates, sulfates, chlorides, sulfides, nitrides, ammonium salts, carboxylates, alkoxides, resinates and so on of the metal element(s) and/or semimetal element(s) (hereinafter, metal and semimetal elements are referred to collectively as 'metal elements') that will be constituents of the phosphor are selected and used as appropriate. Double salts, complex salts, polynuclear complex salts, oxide colloids and so on containing the metal elements can also be used. Moreover, in the case of a phosphor containing a semimetal such as boron or silicon, or phosphorus or the like, boric acid, phosphoric acid, silicic acid, borates, phosphates, silicates and so on can also be used. In addition, a reactive compound able to react with a raw material compound may be added to the raw material solution as appropriate, for example in the case of a sulfide type phosphor, a sulfur compound such as a thiosulfate or a sulfide colloid, or in the case of a nitride type phosphor or an oxynitride type phosphor, a nitrogen compound such as an ammonium salt, urea, thiourea, an azide or a nitride colloid. Moreover, a compound able to react with a plurality of the raw material compounds to form a double salt, a complex or a complex polymer can also be added. The raw material solution obtained is made into fine liquid droplets using an atomizer of ultrasonic type, a two-fluid nozzle type or the like, or another atomizing means.

Next, the liquid droplets are heated at a temperature of 500 to 1800° C., thus removing the solvent, and moreover subjecting the raw material compounds to decomposition and reaction, to produce a compositionally uniform precursor powder comprising hollow particles or porous particles, or fragment-like particles obtained from breakage thereof (hereinafter referred to collectively as 'hollow particles' unless otherwise stated).

In this pyrolysis step, as with an ordinary spray pyrolysis method, the liquid droplets are supplied together with a carrier gas at a constant flow rate into a reaction vessel that has been heated to a high temperature by an electric furnace or the like, and are passed through the reaction vessel in a short time and thus heated. Regarding the atmosphere during the heating, an oxidizing atmosphere, a reducing atmosphere or an inert atmosphere is selected as appropriate in accordance with the targeted phosphor. Moreover, in the case of manufacturing a phosphor containing sulfur or nitrogen, hydrogen sulfide gas, ammonia gas or the like may be included. The heating time is preferably approximately 0.1 to 30 seconds.

In this step, the liquid droplets dispersed in the gaseous phase are heated rapidly, whereby the above-mentioned precursor hollow particles are produced. These hollow particles are carcass particles maintaining the form of the liquid droplets and having a particle size corresponding to the size of the liquid droplets, or fragment-like particles produced through breakage thereof. It is known that, in general, in the case of producing an oxide using the spray pyrolysis method, hollow or porous carcass particles are easily formed. With the conventional spray pyrolysis method, to obtain solid spherical particles, the pyrolysis is carried out under certain restricted conditions for which it is as hard as possible for the particles to become hollow, but in the present invention the raw material compounds, the liquid droplet concentration, the liquid droplet size, the pyrolysis temperature, the residence time and so on are conversely selected such that the particles do not readily become solid but rather hollow precursor particles having a shell of a desired thickness and a desired size are obtained.

To obtain a phosphor powder that is more compositionally uniform and has a higher luminance, the hollow precursor particles preferably have a low crystallinity, and more preferably are amorphous according to X-ray diffraction patterns. Moreover, the hollow precursor particles preferably do not contain large amounts of undecomposed raw material compounds themselves or reaction intermediates produced through the raw material compounds not being completely decomposed. Such precursor particles can be manufactured by suitably controlling the heating temperature and the heating residence time in accordance with the targeted composition. Specifically, it is preferable to make the temperature low in the case that the residence time is long, and make the temperature high in the case that the residence time is short.

In the case that the heating temperature is lower than 500° C., pyrolysis will be insufficient with a residence time in the previously mentioned range, and hence undecomposed raw material compounds and so on will be prone to remaining. Furthermore, heating to a temperature above 1800° C. is unnecessary, and moreover is not practical in terms of actual apparatus design. The pyrolysis is preferably carried out at a temperature of 500 to 1600° C.

Note that in the present step, solid particles having a small particle size may be produced at the same time, but as described later, so long as the effects of the present invention are not impaired, a small amount of solid particles being present is not a problem. Moreover, such small-size solid particles can if necessary be removed by carrying out classification before the following crystallization step.

The precursor powder obtained is next heated at a high temperature, thus crystallizing the precursor powder while maintaining the porous or hollow form. The optimum heating temperature will depend on the composition of the phosphor, but the approximate range is 800 to 1800° C. The crystallization is preferably carried out at a temperature higher than the temperature to which the liquid droplets were heated. The heating is carried out for approximately 0.5 to 24 hours using a batch furnace, or else a continuous furnace such as a pusher furnace, or another ordinary heating furnace such as a rotary kiln. Moreover, the heating may be carried out while dispersing the precursor powder in a gaseous phase to a high degree so as to prevent agglomeration and grain growth due to sintering.

In the crystallization step, it is preferable to crystallize the precursor particles until the desired luminance is exhibited, in particular to make the particles into polycrystals comprising a large number of crystallites. Preferably, the crystallization is carried out such that the crystallite size as determined from broadening of the diffraction peaks in X-ray diffraction is at least 50 nm, more preferably at least 100 nm. If the crystallite size is less than 50 nm, then it will be difficult to obtain a high luminance phosphor. Moreover, if the crystallite size is greater than the desired particle size of the phosphor particles, then a drop in the luminance in the following step will be unavoidable, and hence it will be difficult to obtain high luminance phosphor particles; it is thus preferable to make the crystallite size smaller than the desired particle size. The crystallite size can easily be controlled through the setting of the heating temperature and the heating time in the crystallization step.

Next, the crystallized hollow powder is crushed through grinding. Even after having passed through the crystallization step, the hollow particles that have been formed with a thin shell or skeleton can be crushed into fine particles through mechanical grinding with a low force or for a very short time. It is thus thought that very little damage and very few defects will arise on the surface of or inside the particles through the grinding, and hence highly crystallized fine particles can be obtained with no great drop in luminance. The grinding is carried out until the desired particle size and the desired shape are achieved, using any of various commonly used grinding machines, for example a ball mill, a jet mill, an impact mill, or a mortar. However, if the mean particle size becomes less than 0.1 μm, then even with the present method a large drop in luminance will be unavoidable, and moreover agglomeration will become prone to occurring through the annealing in the following step; it is thus preferable to carry out the grinding such that the mean particle size becomes approximately 0.1 to 2 μm.

Depending on the extent of the grinding and the nature of the hollow particles, the powder produced through the grinding will comprise flat particles, spherical particles, acicular particles, irregularly shaped particles, or a mixture thereof. In the present invention, by suitably selecting the conditions under which the precursor powder is produced such that hollow particles of a desired size having a shell of a desired thickness are produced, and suitably setting the extent of the grinding, phosphor particles having any of various shapes and structures can be produced. For example, if hollow particles having a thin shell are ground, then flat particles can easily be manufactured. In particular, in the case that the crystal form is anisotropic as with an aluminate type phosphor such as $BaMgAl_{10}O_{17}$:Eu, the particles readily become flat upon light grinding. Regarding flat particles, any of plate-shaped or flake-shaped ones, or planar ones or ones having curvature like a portion of a spherical surface, or a mixture thereof can be produced as desired, through the conditions under which the hollow particles are produced and the extent of the grinding. For example, to form a thin phosphor film with a good filling rate through coating or the like, particles that are close to planar and are thin are preferable, and in this case it is preferable to select the conditions such that hollow particles that are as large as possible and have as thin a shell as possible are produced. Note that in the step of producing the hollow particles, as described earlier, depending on the conditions fine solid spherical particles or small-size hollow particles may be produced at the same time; in the case that one wishes to obtain only a powder comprising substantially only flat particles, it is preferable to control the conditions under which the precursor is produced so that such particles are produced as a byproduct as little as possible, or else remove the byproduct small-size particles by carrying out classification immediately after the step of producing the hollow particles.

Moreover, depending on the grinding conditions, any particles from polycrystalline particles to monocrystalline particles can be produced. In the case that monocrystalline fine particles are required, grinding may be carried out until the particles become substantially monocrystalline. If the grinding is stopped in a state in which the particles are polycrystalline, then flat particles are readily obtained, whereby polycrystalline high-coverage flat high-luminance phosphor particles that could not be obtained hitherto can be produced.

The powder obtained through the grinding can subsequently be subjected to annealing treatment if desired to increase the luminance. The annealing is carried out by carrying out heat treatment in an oxidizing atmosphere, a reducing atmosphere or an inert atmosphere in accordance with the targeted phosphor, preferably at a temperature lower than that in the above crystallization step, generally a temperature of 600 to 1600° C. Through this heat treatment, defects on the surface of or inside the particles that have arisen through being subjected to physical shock and chemical reaction during the grinding are repaired, and a phosphor powder comprising highly-crystallized and highly-luminescent phosphor particles is produced. With the method of the present invention, as described earlier, it is thought that there is very little damage to the particles due to the grinding, and hence the luminance can easily be restored through annealing treatment. Moreover, because the crystallinity of the ground particles is very good, agglomeration is not prone to occurring during the annealing. A very fine high-luminance phosphor powder can thus be obtained.

A phosphor composition for producing a phosphor layer is manufactured by mixing the phosphor powder of the present invention with a resin and/or a solvent, and if desired any of various commonly included additives, using normal methods. For example, the phosphor powder is dispersed in a vehicle comprising the resin and/or solvent to form a phosphor ink or a phosphor paste, or this is formed into a sheet shape, and dried to form a green sheet. Moreover, the phosphor powder may be kneaded into a resin to obtain a resin composition for molding.

Following is a more concrete description of the present invention, citing examples and comparative examples.

EXAMPLE 1

Barium nitrate, europium nitrate hexahydrate, magnesium nitrate hexahydrate and aluminum nitrate nonahydrate were weighed out such that the molar ratio therebetween was 0.9:0.1:1:10 and were dissolved in deionized water, thus preparing a raw material solution having a metal concentration of 0.72 mol/liter.

This solution was made into fine liquid droplets using an ultrasonic atomizer, and using air as a carrier gas, the fine liquid droplets were supplied into a ceramic tube heated to 1200° C. in an electric furnace. The residence time in the furnace was made to be approximately 2 seconds. The liquid droplets were subjected to pyrolysis upon passing through the heating zone, thus producing a precursor powder that was amorphous according to X-ray diffraction patterns. Upon subjecting this precursor powder to SEM observation, it was found that the precursor powder was constituted predominantly from hollow particles and fragment-like particles apparently produced through breakage of such hollow particles, and the mean particle size thereof was approximately 7 μm.

Next, the precursor powder obtained was crystallized by carrying out heat treatment for 2 hours at 1550° C. in nitrogen gas containing 4% hydrogen in a batch furnace. Through this treatment, the precursor particles were crystallized while maintaining the form of hollow particles, and it was found from X-ray diffraction that a $Ba_{0.9}Eu_{0.1}MgAl_{10}O_{17}$ single phase was formed. The crystallite size measured through X-ray diffraction was approximately 300 nm. FIG. 1 shows an SEM micrograph of the precursor powder after the crystallization. Hollow particles having a thin shell and comprising crystallites of homogeneous size and shape, and fragments thereof are seen.

Figure 2:
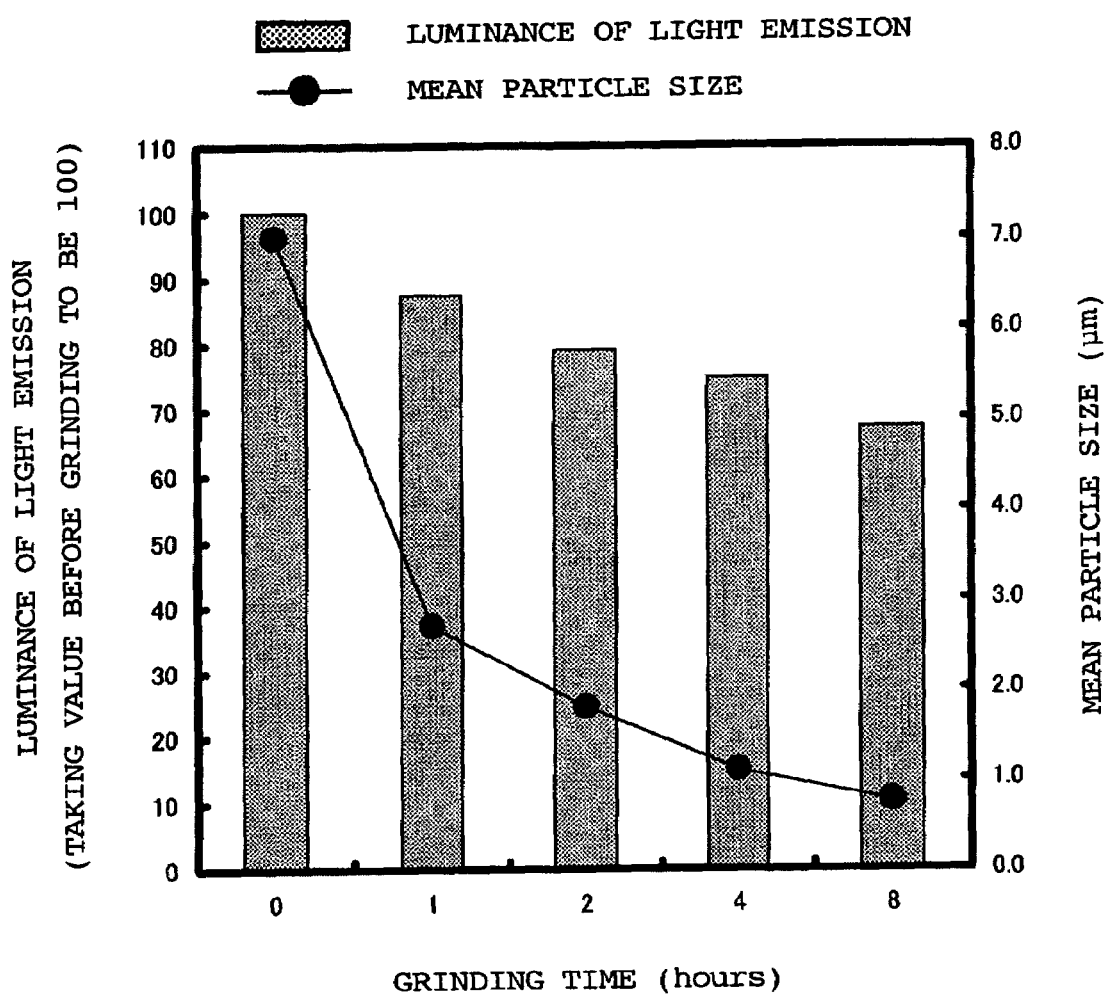
FIG. 2 is a graph showing the changes in the mean particle size and the luminance of light emission of the phosphor powder upon changing the grinding time in Example 1.

Next, the crystallized powder was ground in a ball mill using alumina balls of diameter 5 mm. FIG. 2 shows the changes in the mean particle size and the luminance of light emission upon exciting with ultraviolet radiation of wavelength 254 nm upon changing the grinding time. It can be seen that particles having a size of not greater than 2 μm are easily obtained by grinding, and that there is little drop in the luminance despite the reduction in the particle size. The powder obtained comprised flat particles containing small amounts of irregularly shaped particles and spherical particles, and the crystallite size according to X-ray diffraction was approximately 300 nm, which is the same as for the crystallized particles before the grinding.

EXAMPLE 2

Figure 3:
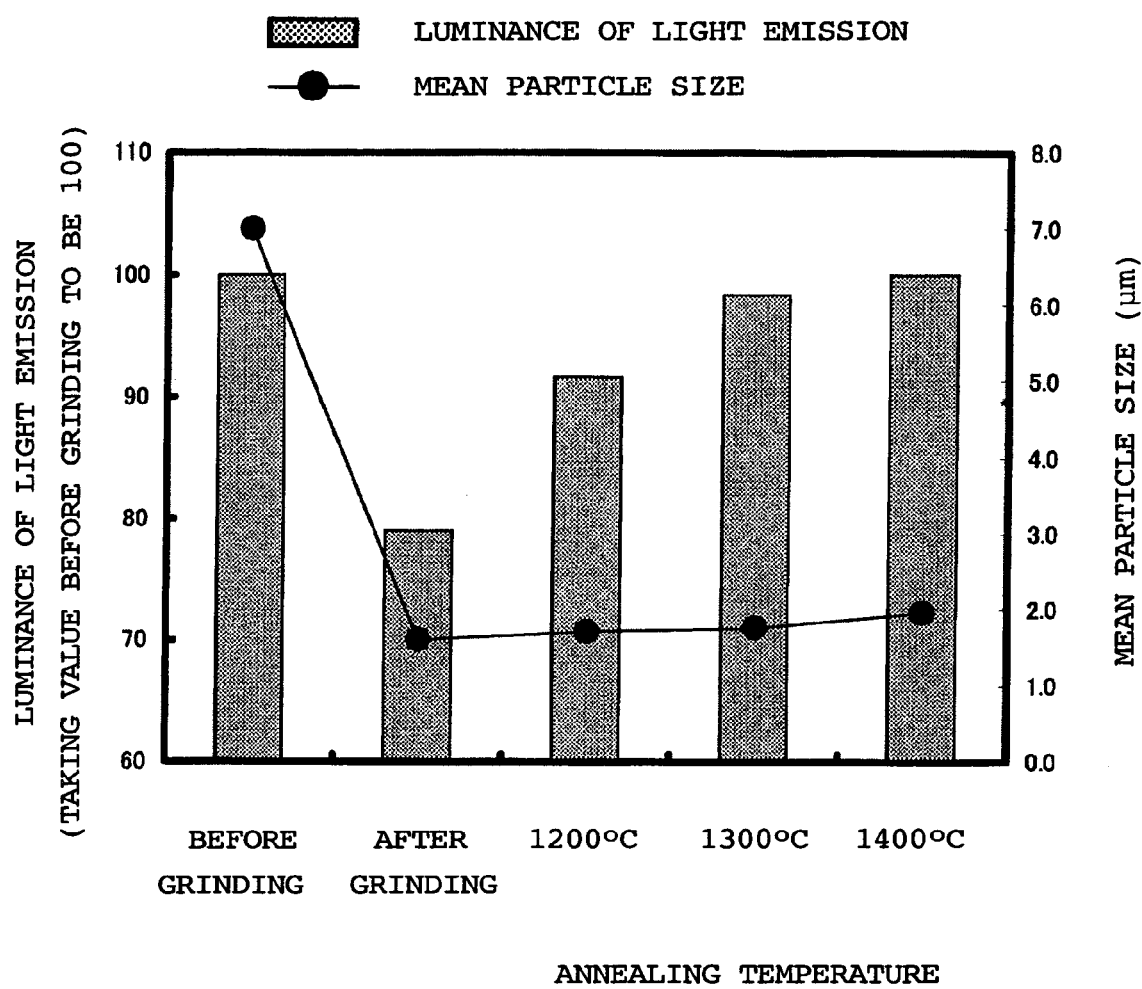
FIG. 3 is a graph showing the changes in the mean particle size and the luminance of light emission of the phosphor powder upon changing the annealing temperature in Example 2.
Figure 4:
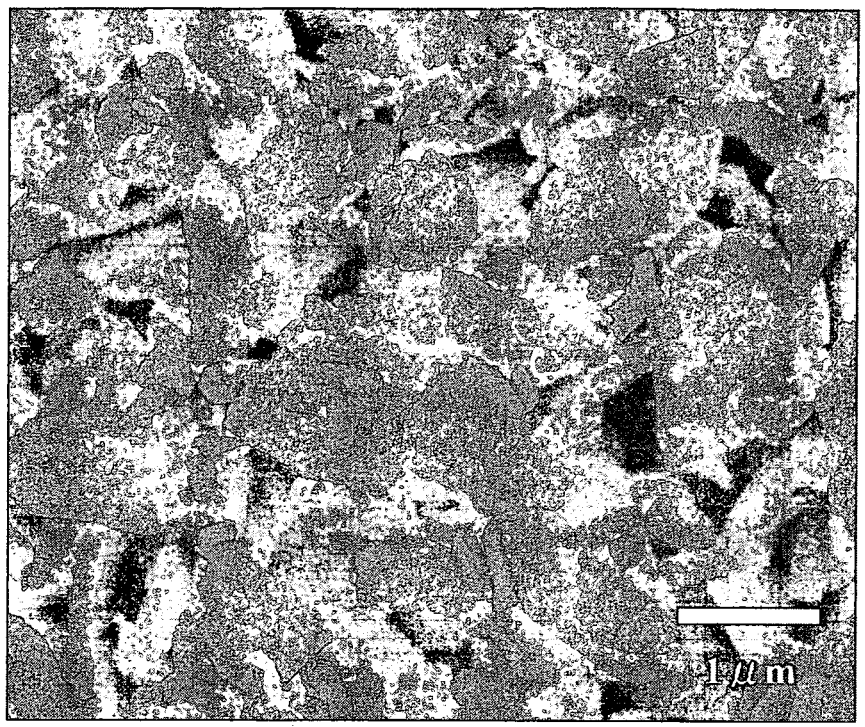
FIG. 4 is an SEM micrograph of a phosphor powder obtained in Example 2.

The powder obtained in Example 1 by carrying out the ball mill grinding for 2 hours was annealed for 1 hour in nitrogen gas containing 4% hydrogen in a batch furnace. The changes in the mean particle size and the luminance of light emission (excited with 254 nm ultraviolet radiation) with the annealing temperature are shown in FIG. 3. From FIG. 3, it can be seen that through the annealing, the luminance of light emission can be increased without greatly changing the particle size, and a fine powder exhibiting a luminance of light emission approximately the same as that before the grinding can be obtained. FIG. 4 shows an SEM micrograph of the $Ba_{0.9}Eu_{0.1}MgAl_{10}O_{17}$ powder of mean particle size 1.7 μm obtained with an annealing temperature of 1300° C. The crystallite size according to X-ray diffraction was approximately 300 nm.

COMPARATIVE EXAMPLE 1

Barium carbonate, basic magnesium hydroxide, aluminum oxide, europium oxide, and a small amount of aluminum fluoride were ground and mixed, and then the mixture was subjected to a solid-phase reaction in nitrogen gas containing 4% hydrogen for 3 hours at 1550° C. using a batch furnace, thus obtaining lumpy $Ba_{0.9}Eu_{0.1}MgAl_{10}O_{17}$. This product was ground for 30 hours in a ball mill, and then annealing was carried out for 1 hour at 1300° C. in nitrogen gas containing 4% hydrogen using a batch furnace. The mean particle size of the powder obtained was approximately 2.5 μm. Upon measuring the luminance of light emission upon exciting with 254 nm ultraviolet radiation, this luminance of light emission was only approximately 70% of that of the powder of Example 2 even though the particle size was larger than for the powder of Example 2.

EXAMPLE 3

Yttrium nitrate and europium nitrate hexahydrate were weighed out such that the molar ratio therebetween was 1.84:0.16 and were dissolved in deionized water, thus preparing a raw material solution having a metal concentration of 0.8 mol/liter.

This solution was made into fine liquid droplets using an ultrasonic atomizer, and using air as a carrier gas, the fine liquid droplets were supplied into a ceramic tube heated to 800° C. in an electric furnace. The residence time in the furnace was made to be approximately 2 seconds. The liquid droplets were subjected to pyrolysis upon passing through the heating zone, thus producing a precursor powder that was amorphous according to X-ray diffraction patterns. Upon subjecting this precursor powder to SEM observation, it was found that the precursor powder was constituted predominantly from porous particles and fragment-like particles apparently produced through breakage of such porous particles, and the mean particle size thereof was approximately 5 μm.

Figure 5:
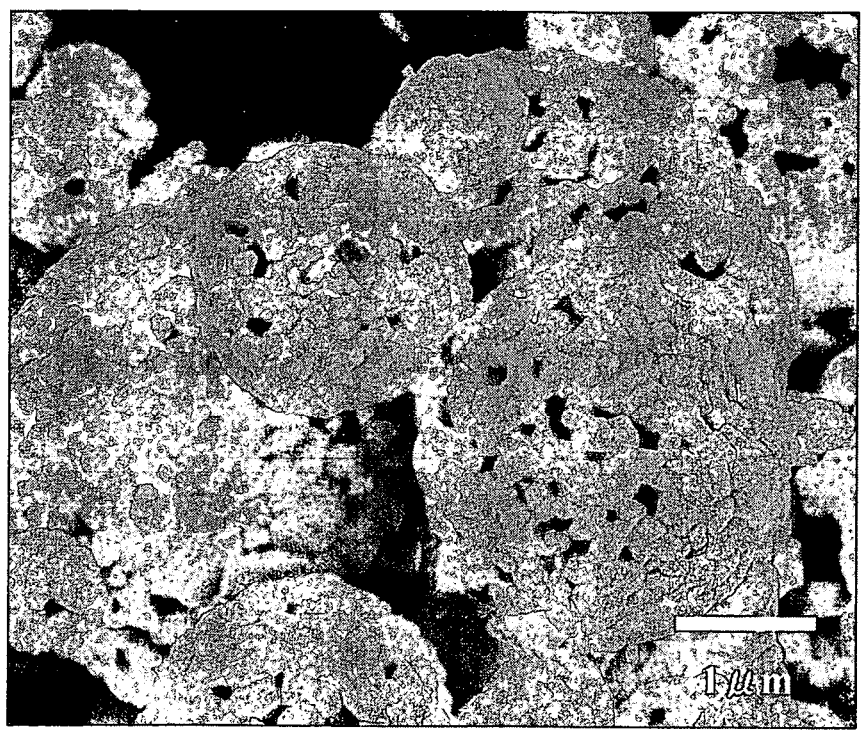
FIG. 5 is an SEM micrograph of a precursor powder of Example 3 after crystallization.

Next, the precursor powder obtained was crystallized by carrying out heat treatment for 2 hours at 1400° C. in air in a batch furnace. Through this treatment, the precursor particles were crystallized while maintaining the form of porous particles, and it was found from X-ray diffraction that a $Y_{1.84}Eu_{0.16}O_3$ single phase was formed. FIG. 5 shows an SEM micrograph. The crystallite size measured through X-ray diffraction was approximately 400 nm.

Next, the crystallized powder was ground for 2 hours in a ball mill using alumina balls of size 2 mm, and then annealing was carried out for 1 hour at 1100° C. in air in a batch furnace.

Figure 6:
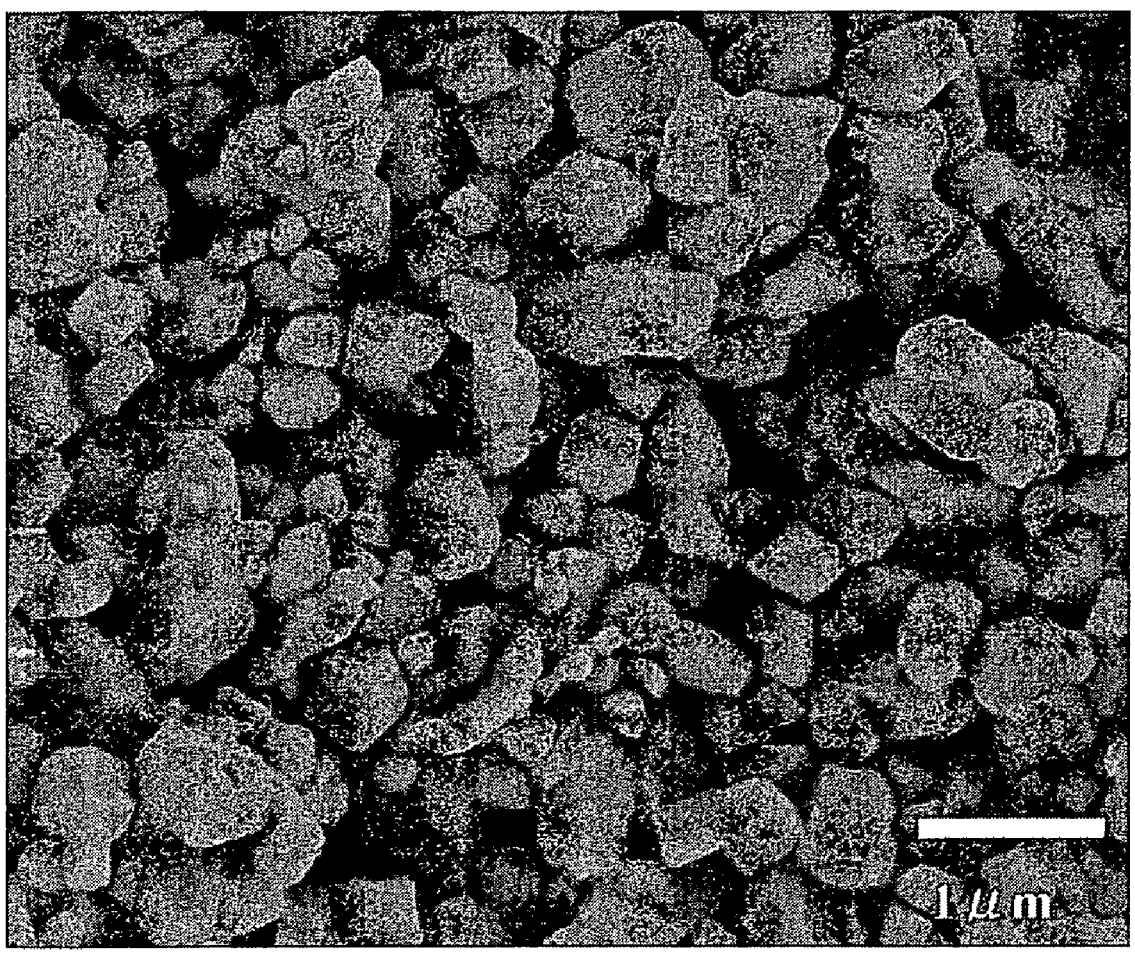
FIG. 6 is an SEM micrograph of a phosphor powder obtained in Example 3.

FIG. 6 shows an SEM micrograph of the powder obtained. The mean particle size of the powder was approximately 1.5 μm, and the powder was a mixture of particles that appear to be single crystals having idiomorphic faces, and approximately spherical or irregularly shaped particles comprising such monocrystalline particles aggregated together. The crystallite size according to X-ray diffraction was approximately 400 nm, which is the same as for the crystallized particles before the grinding.

COMPARATIVE EXAMPLE 2

Yttrium oxide, europium oxide and a small amount of lithium carbonate were ground and mixed, and then the mixture was subjected to a solid-phase reaction in air for 5 hours at 1400° C. using a batch furnace, thus obtaining lumpy $Y_{1.84}Eu_{0.16}O_3$. This product was ground for 30 hours in a ball mill, and then annealing was carried out for 1 hour at 1100° C. in air using a batch furnace. The mean particle size of the powder obtained was approximately 3.0 μm. Upon measuring the luminance of light emission upon exciting with ultraviolet radiation of wavelength 254 nm, this luminance of light emission was only approximately 80% of that of the powder of Example 3 even though the particle size was larger than for the powder of Example 3.

What is claimed is:

1. A method of manufacturing a highly crystallized phosphor powder, comprising: making a raw material solution containing metal elements and/or semimetal elements that will be constituents of the phosphor into fine liquid droplets, subjecting the liquid droplets to decomposition by heating at a temperature of 500 to 1800° C. to produce hollow pre cursor particles and/or porous precursor particles, heating the precursor particles to crystallize the precursor particles while maintaining the hollow or porous form, and grinding the crystallized particles down to a predetermined particle size.

2. The method according to claim 1, wherein the precursor particles are amorphous according to X-ray diffraction patterns.

3. The method according to claim 1, wherein the powder obtained through the grinding is further subjected to annealing treatment.

4. The method according to claim 1, wherein the crystallized particles are polycrystals comprising crystallites having a crystallite size of at least 50 nm.

* * * * *